United States Patent
Posthuma (12)

(10) Patent No.: US 6,519,253 B1
(45) Date of Patent: Feb. 11, 2003

(54) TELECOMMUNICATION EQUIPMENT SUPPORT OF ISDN COMMUNICATION LINES FOR HIGH SPEED DATA TRANSMISSION

(75) Inventor: Carl R. Posthuma, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/258,879

(22) Filed: Feb. 25, 1999

Related U.S. Application Data

(63) Continuation-in-part of application No. 08/767,138, filed on Dec. 19, 1996, now Pat. No. 6,144,659.

(51) Int. Cl.⁷ .............................................. H04M 11/06
(52) U.S. Cl. ........................ 370/359; 370/420; 370/463
(58) Field of Search .................................. 370/524, 463, 370/359, 420, 493

(56) References Cited

U.S. PATENT DOCUMENTS 5,781,728 A  *  7/1998  Rybicki et al.
6,144,659 A  * 11/2000  Nye et al. ................... 370/359
6,236,164 B1 *  5/2001  Erreygers ................... 370/492

* cited by examiner

Primary Examiner—Ken Vanderpuye
(74) Attorney, Agent, or Firm—Grossman, Patti & Brill

(57) ABSTRACT

A line termination unit which supports Integrated Services Digital Network (ISDN) and high speed data (HSD) services such as asymmetric digital subscriber loop (ADSL) or XDSL services to a subcriber over a common two-wire subscriber line. The line termination unit has a line termination circuit that connects to the subscriber line and provides ISDN signals to the line. The line support circuit receives incoming ISDN and HSD signals from the line and transmits outgoing ISDN and HSD signals to the line. The received incoming analog signals are separated into first (ISDN information) signals and second (HSD information) signals. The first signals are converted into third digital signals having a format used for ISDN signals by an associated central office and transmitting the third digital signals to the central office. The second signals are converted into fourth digital signals having a format used for HSD signals by an associated central office and the fourth digital signals are transmitted to the central office.

15 Claims, 4 Drawing Sheets

TELECOMMUNICATION EQUIPMENT SUPPORT OF ISDN COMMUNICATION LINES FOR HIGH SPEED DATA TRANSMISSION

CROSS REFERENCE TO RELATED APPLICATION

This application is a continuation-in-part of U.S. patent application Ser. No. 08/767,138 entitled "Telecommunication Equipment Support of High Speed Data Services" of Nye et al. filed Dec. 19, 1996 now U.S. Pat. No. 6,144,659.

BACKGROUND OF THE INVENTION

The invention relates to telecommunication line termination equipment and in particular to Integrated Services Digital Network (ISDN) line termination equipment.

There is an ever pressing need to provide consumers of telecommunication services with high speed data services. Many subscribers use plain old telephone services (POTS) lines to carry data communication signals between computer devices employing modems to communicate via the public switched telephonic network. Unfortunately, the maximum data rate using modems of a POTS subscriber line is limited by many factors including the sampling rate, bandwidth, and the analog to digital signal conversion rate for the line cards which terminate the POTS lines.

Other subscriber lines are available, however, which provide higher data rates. Integrated Services Digital Network (ISDN) lines provide a subscriber with telephone services generally at a higher data rate than conventional POTS lines. Subscribers utilize an ISDN line to carry digital signals controlled by a personal computer to another ISDN set, modem or ISDN modem pool via the public switched telephone network. It will be appreciated that the maximum data rate which can be transmitted using modems over an ISDN subscriber line is limited to 144 kilobits per second.

Subscribers can lease special lines from their telephone providers which accommodate higher data rates than are supported by conventional dial-up subscriber lines or by ISDN lines. Recently, Asymmetric Digital Subscriber Line (ADSL) technology has evolved which provide even higher data transmission speeds than ISDN technology. The known ADSL technique which is supported by available equipment provides a significantly higher data rate to a subscriber over a conventional copper two-wire subscriber line. Proper terminating equipment at the consumer location and the telephone service provider central office is required to employ ADSL technology.

Referring now to FIG. 1, currently available services for subscribers using conventional two wire copper loops are illustrated. Equipment to the right of dashed line 10 represents customer premises equipment (CPE); equipment to the left of line 10 represents central office line termination equipment. The ISDN line interface 12 also known as a line card, provides an interface between digital incoming and outgoing communication lines 14 and 16, and analog signals carried on subscriber line 18. For example, lines 14 and 16 may carry 2–64 kilobits per second (kbps) and 1–16 kbps signals representative of information received from and transmitted to line 18. A main distribution frame (MDF) 20 is used to interconnect a plurality of incoming subscriber lines to various terminating equipment at the central office. In this example, line 18 is connected through an ISDN splitter 19 and MDF 20 to subscriber line 22. A conventional ISDN station set or instrument 24 at the consumer's premises is connected through ISDN splitter 23 to subscriber line 22.

FIG. 1 also illustrates another service to the subscriber which provides a high speed data capability. An ADSL interface circuit 26 provides an interface between the central office and the subscriber for transmitting and receiving data at rates up to several Megabits per second. Lines 28 and 30 provide inbound and outgoing digital data communications representative of information to and from the subscriber carried on line 32. Line 32 is connected via ISDN splitter 19 and MDF 20 to subscriber line 22. An ADSL interface 36 provides an interface between conventional digital data communicated with a user's personal computer 38 and ADSL analog format signaling communicated on line 37. The ISDN splitter 23 couples the ADSL signal between ADSL interface 36 and subscriber line 22. The advantage to the user is that the ADSL facilities support a substantially higher data rate than would be available if the subscriber utilized communications terminated via the ISDN line interface 12.

A disadvantage illustrated in FIG. 1 is that ISDN splitters 19 and 23 are required. These known ISDN splitters function to separate the higher frequency signals associated with ADSL signaling from the lower frequency signals (typically <80–110 kilohertz) associated with the conventional ISDN communications. The conventional ISDN splitter consist of a lattice of inductors and capacitors that provides the needed filtering while maintaining the ISDN signals. The components (inductors and capacitors) used in the ISDN splitter occupy a relatively large volume. Thus, a conventional ISDN splitter occupies a significant amount of space.

Unfortunately, conventional ISDN termination equipment is complex (especially in wiring devices) and is not highly integrated when employing ADSL technology. Moreover, bulky splitters are required taking up a significant amount of space in the terminating equipment cabinets. The size of the splitters and the wiring associated with connecting them to the MDF, ADSL interface and the ISDN line interface take up precious space which is limited. The problem is magnified as more and additional subscribers request services. Accordingly, there is a need to provide highly integrated equipment enabling high speed ADSL technology services on ISDN lines while minimizing space and wiring requirements.

SUMMARY OF INVENTION

It is an object of the present invention to address the above referenced need by providing a solution which minimizes the space and wiring associated with the central office terminating equipment for high speed data services.

In accordance with one embodiment of the present invention, access interface units terminate subscriber lines by which the corresponding subscribers can utilize ISDN services and/or high speed data services such as ADSL. The access interface units support both types of service without utilizing a conventional ISDN splitter. The access interface units include a line support circuit wherein two way communications on the subscriber loop are separated into inbound and outbound communications on separate channels. The inbound communications are split into first and second signals. The first signal is low pass filtered and converted into digital format signals by a conventional ISDN receiver. The second signal is high pass filtered and converted into digital format signals by a high speed data receiver. The outbound communication is the summation of third and fourth analog signals from an ISDN transmitter and high speed data transmitter. An important aspect of this invention resides in the ability to use conventional low voltage, low current passive and active components for the low pass and high pass filters.

DETAILED DESCRIPTION

In accordance with the present invention, a single subscriber line supports at least two different classes of subscriber services, e.g. ISDN and high speed data services such as XDSL. The "X" in XDSL represents one of a family of digital subscriber line services, such as ADSL (Asymmetric), ADSL lite, RDSL (Rate-adaptive), and VDSL (Very high speed). As used herein "high speed data interface" refers to apparatus that uses a signaling method to provide higher data transmission speeds than can be supported by conventional ISDN line terminating equipment. For further details of providing XDSL services for a subscriber, reference can be made to U.S. patent application Ser. No. 08/767,138 of Nye et al. filed Dec. 19, 1996 entitled "Telecommunication Equipment Support of High Speed Data Services" which is incorporated herein by reference.

Figure 1:
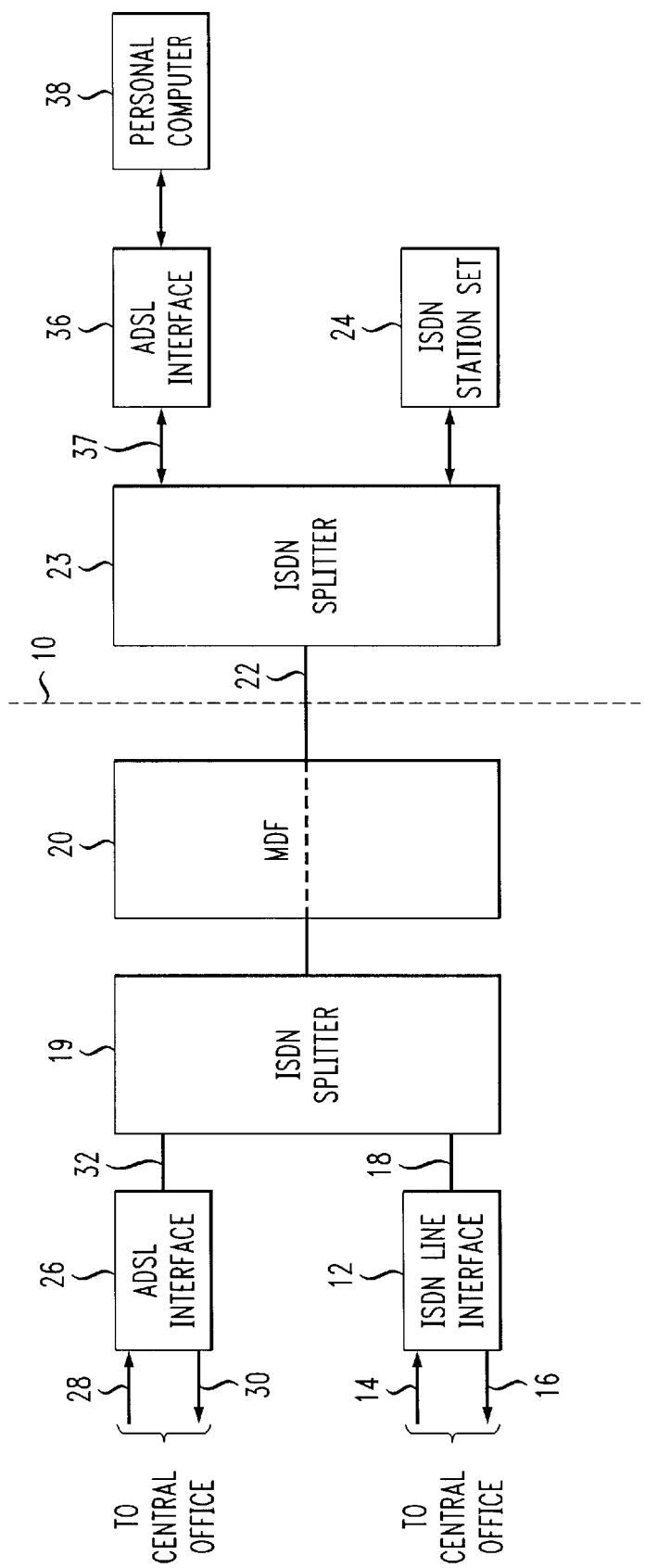
FIG. 1 illustrates a conventional implementation in which a subscriber is provided ISDN and high speed data services by using an ISDN splitter to support line termination equipment.
Figure 2:
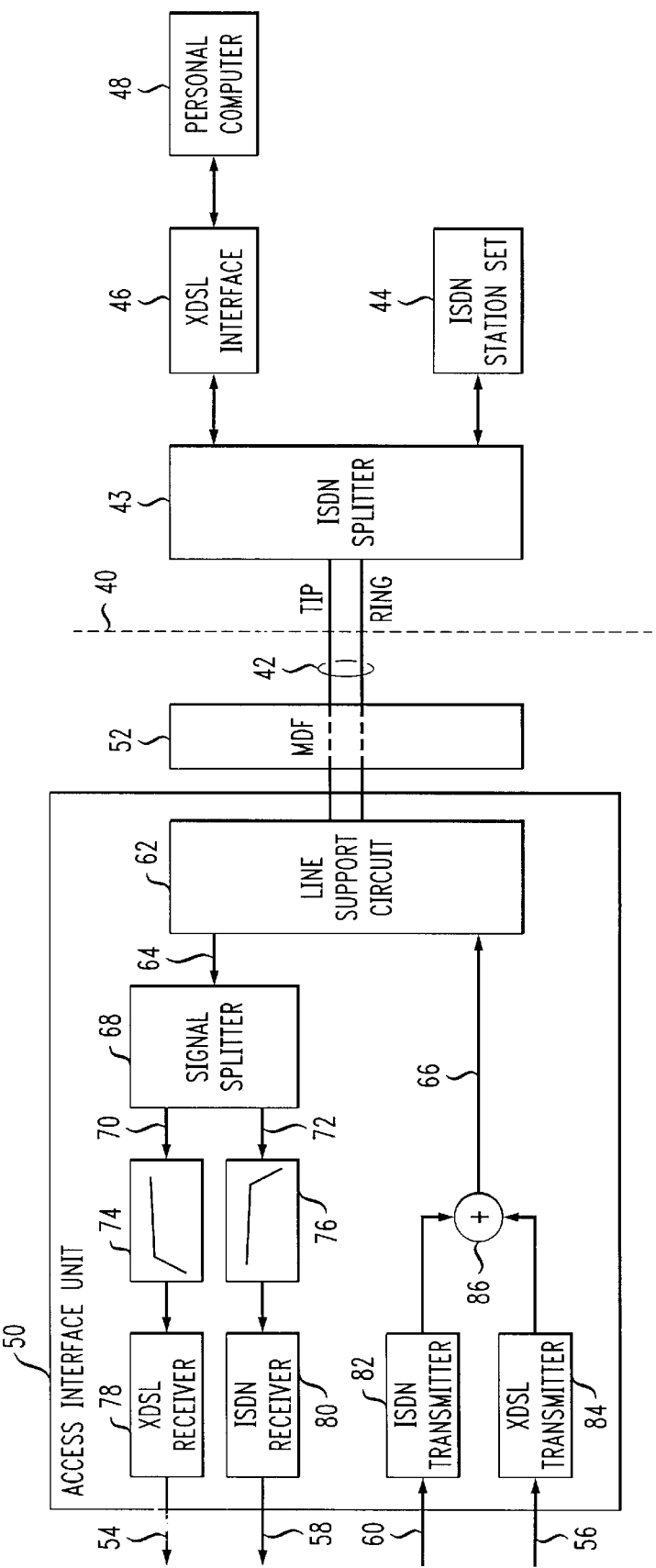
FIG. 2 illustrates an embodiment of the present invention where an access interface unit accommodates ISDN and high speed data services over a single subscriber line without requiring a conventional splitter at the terminating central office equipment.

Referring to FIG. 2, consumer premises equipment is located to the right of dashed line 40; central office equipment including line terminating equipment is located to the left of dashed line 40. A two-wire copper subscriber line 42, also known as a subscriber loop, connects consumer premises equipment located to the right of line 40 with central office terminating equipment to the left of line 40. The subscriber may utilize a conventional ISDN instrument 44 which can be connected to subscriber line 42 via an ISDN splitter 43 to receive ISDN signals. The subscriber may elect to couple a high speed data interface, e.g., XDSL interface 46, via ISDN splitter 43 to subscriber line 42 to support high speed data communications. A personal computer 48 is illustratively shown connected to XDSL interface 46. It will be appreciated by those skilled in the art that equipment other than personal computer 48 may be utilized to transmit or receive a variety of data representing different types of information.

An access interface unit (AIU) 50 terminates subscriber line 42 via MDF 52. The AIU 50 is responsible for all interactions and communication signals transmitted to and received from subscriber line 42. Additionally, AIU 50 is responsible for providing separate inbound and outbound data paths for communicating information with the central office switch such as utilizing ISDN digital signals or asynchronous transfer mode (ATM) format signals. Communication channels 54 and 56 carry inbound and outbound high speed digital information, respectively. Communication channels 58 and 60 similarly carry inbound and outbound conventional ISDN information, respectively.

Line support circuit 62 terminates subscriber line 42 and provides conventional ISDN subscriber line support facilities. The line support circuit 62 provides the simplex to duplex communications interface by which duplex communications on subscriber line 42 are separated into independent transmit and receive communications coupled to the central office. Line 64 carries information from the subscriber and line 66 carries information to be transmitted to the subscriber. Line 64 is coupled to signal splitter 68 which splits the information received from the subscriber into two substantially equal signals, one signal being applied to line 70 and the other signal being applied to line 72. Line 70 is coupled to high pass filter 74 and line 72 is coupled to low pass filter 76. The outputs from the high pass filter 74 and low pass filter 76 are coupled respectively to the XDSL receiver 78 and ISDN receiver 80. The low pass filter 76 passes signals with frequencies relevant for conventional ISDN communication, such as below 80–120 Kilohertz, to the ISDN receiver which translates the ISDN signals into digital signals which are transmitted on line 58 to central office equipment. High pass filter 74 passes signals with frequencies above the cut-off frequency of filter 76, e.g. above 80–120 Khz, as used in known XDSL over ISDN signal encoding (between about approximately 138 Kilohertz and 1100 Kilohertz for ADSL). The XDSL receiver 78 converts the high pass filtered signals into other conventional signals such as ATM signals transmitted on channel 54 to the central office equipment.

Information transmitted to subscriber line 42 is received from central office facilities on communication channels 60 and 56. The ISDN transmitter 82 receives digital information, to be translated into conventional ISDN signals. Digital data, such as in ATM format, is received on communication channel 56 via XDSL transmitter 84 which converts this data into corresponding XDSL analog signals which are transmitted to signal combiner 86. Likewise, the analog output from ISDN transmitter 82 is sent to combiner 86 which sums the input analog signals into a resulting output signal carried on line 66 to line support circuit 62.

Figure 3:
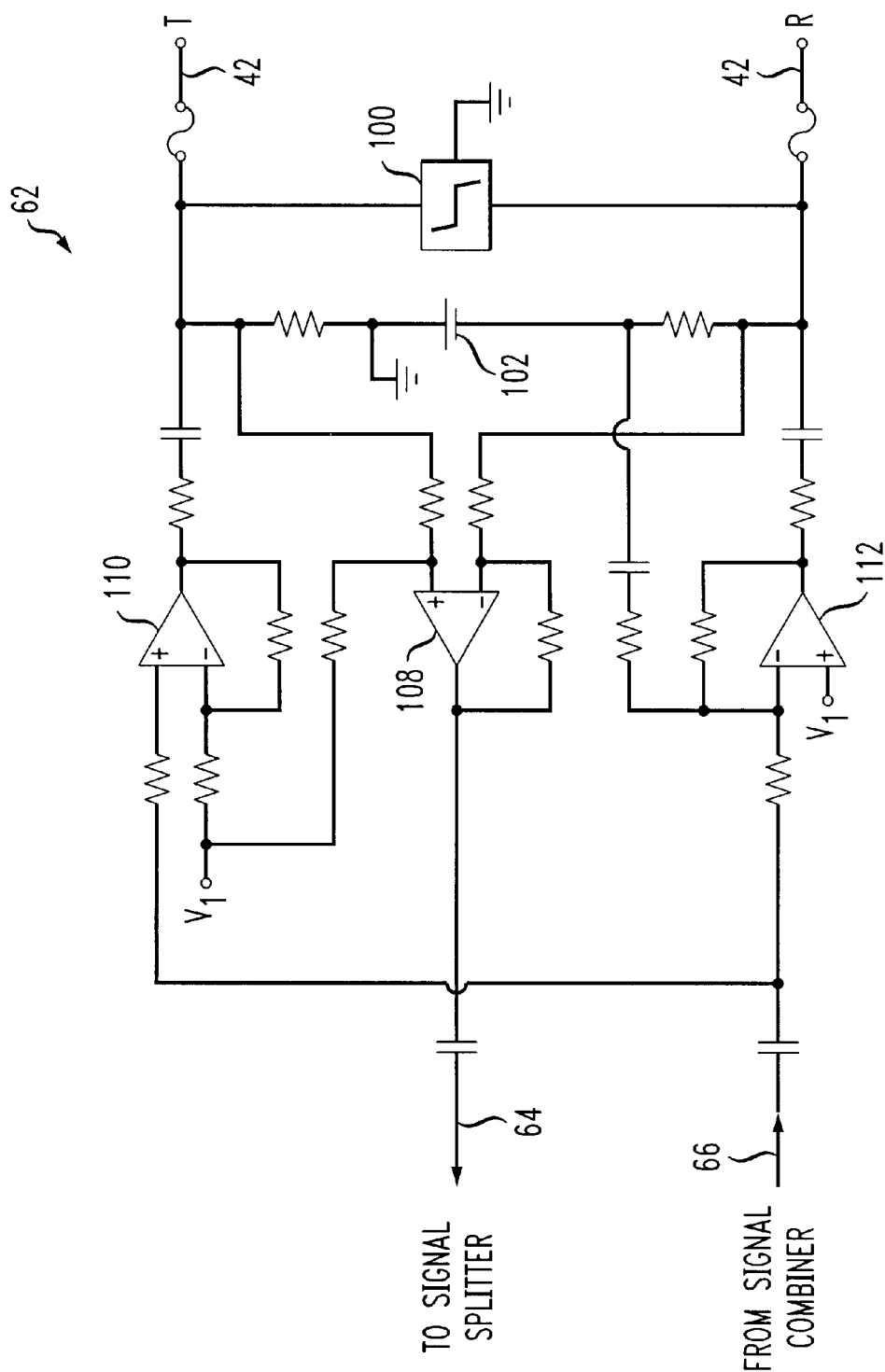
FIG. 3 illustrates an exemplary embodiment of the line support circuit as shown in FIG. 2.

FIG. 3 is an illustrative embodiment of line support circuit 62. The tip (T) and ring (R) conductors define subscriber line 42. An over voltage protection device 100 is used to limit the maximum voltages which can appear across the subscriber line 42. A source of DC current such as central office battery 102 provides a sealing current supplied to conventional ISDN subscriber lines. Operational amplifier 108 is connected with inputs to subscriber line 42 and provides an amplified signal replica of information transmitted from the subscriber to its output coupled to line 64. Operational amplifiers 110 and 112 obtain an input signal from line 66 from the signal combiner. The respective outputs from amplifiers 110 and 112 are coupled to the tip and ring lines of subscriber line 42. These amplifiers transmit signals from the central office to the subscriber line. There are alternate embodiments of the line support circuit, for example voltage addition circuits and/or current addition circuits may selectively be employed.

Additional details of operation concerning the circuit as show in FIG. 3 may be obtained by referencing U.S. Pat. No. 5,528,688, which is incorporated herein by reference. In accordance with the present invention, the capacitors shown in FIG. 3 in series with the input and output signals are selected to have a capacitance value when considered with the corresponding equivalent resistances to pass the required frequency bandwidth to handle both conventional ISDN services and XDSL services. That is, the components of this circuit are selected to provide a frequency bandwidth extending between approximately 20 hertz and 1.5 megahertz. When conventional ISDN class of services is being utilized, low pass filter 76 as shown in FIG. 2 is utilized to eliminate any unwanted higher frequency signal components which may be present due to the extended frequency bandwidth needed to accommodate XDSL signaling.

Figure 4:
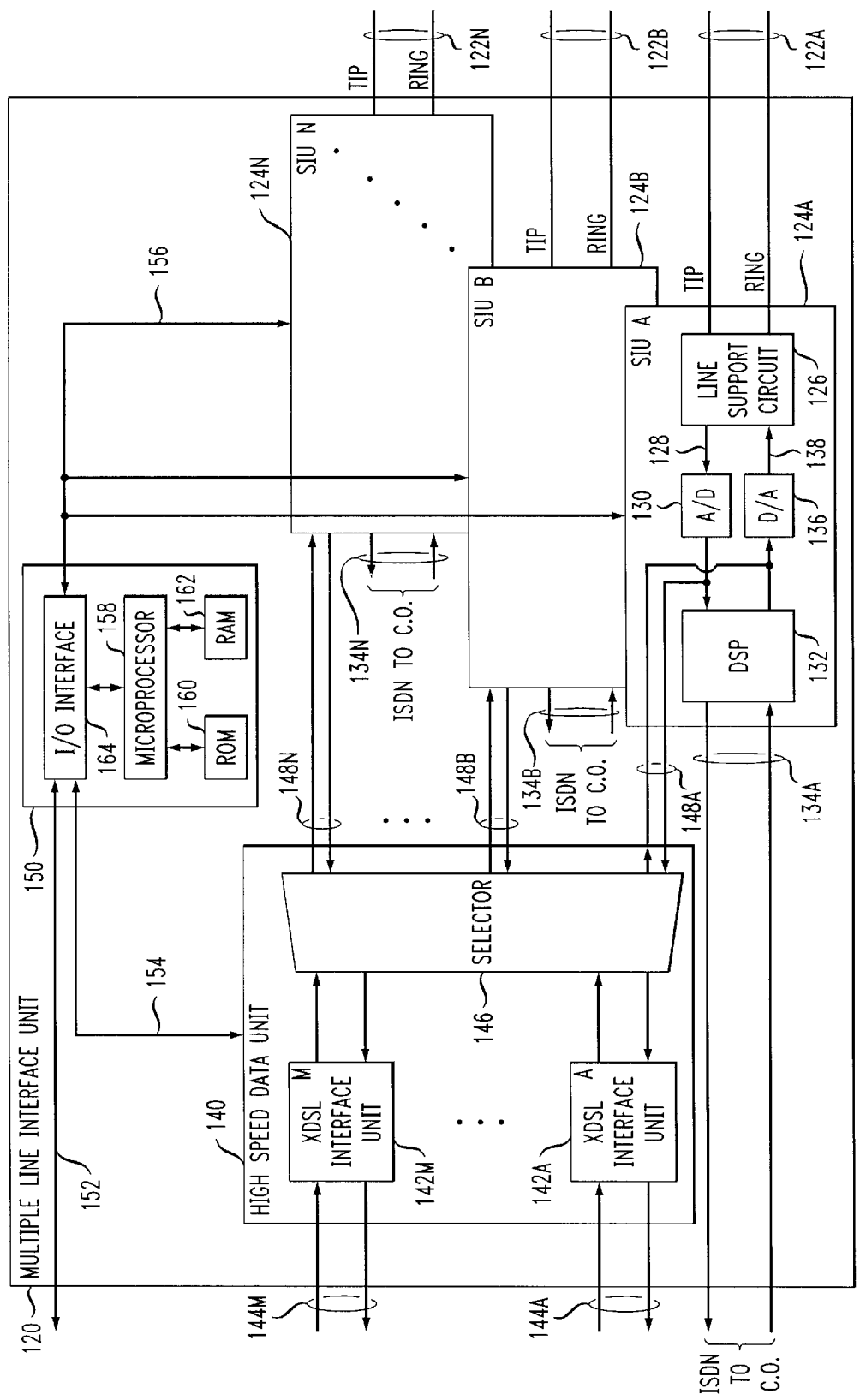
FIG. 4 illustrates another embodiment of the present invention in which a multiple line interface unit terminates several subscriber lines and shares high speed data resources among the subscriber lines.

FIG. 4 illustrates an alternative embodiment of the present invention. In this embodiment, a multiple line interface unit (MLIU) 120 terminates subscriber lines 122A, 122B, . . . 122N by corresponding subscriber interface units (SIU) 124A, 124B, . . . 124N. Since each of the SIUs are identical and support ISDN service for each respective subscriber line, only SIU 124A will be described. SIU 124A includes a line support circuit (LSC) 126 such as shown in FIG. 3. Inbound analog information from LSC 126 is coupled on line 128 to analog to digital converter 130 which sends the digitized information to digital signal processor (DSP) 132. The DSP 132 processes the digitized information, converts it into a format used by the central office, and sends the signals to the central office on the inbound path of lines 134. Outbound signals from the central office on the outbound path of lines 134A, 134B...134N are received by DSP 132 and converted back into digital signals which can be directly translated by digital to analog converter 136 into analog signals sent on line 138 to LSC 126. Thus, each SIU supports ISDN for the respective subscriber line.

In accordance with this embodiment, a high speed data unit (HSDU) 140 supports high speed data services such as XDSL for a predetermined number of subscriber lines and is shared among the subscriber lines, i.e. among the SIUs. This is done to make the MLIU 120 more economical as compared with an approach where high speed data interfaces are provided on a one to one basis for each subscriber line. HSDU 140 includes XDSL interface units 142A . . . 142M which comprise XDSL transceivers that translate the digitized subscriber information into XDSL formatted information transmitted and received on lines 144A . . . 144M to the central office such as via ATM facilities. A selector 146 selects which of the interface units 142A . . . 142M will be connected via lines 148A, 148B, . . . 148N to respective SIUs 124A, 124B, . . . 124N. Since M is an integer less than N, not all SIUs can be concurrently provided with high speed data services. While this is a limitation, the number of subscribers requesting high speed data services at any given time can be forecast and the M/N ratio determined to provide a targeted class of service.

Lines 148A . . . 148N support the flow of digital information between the SIUs and HSDU. Filtering of unwanted high frequency components associated with the high speed data is incorporated using known digital filtering techniques by the DSPs on the SIUs. Similarly, the filtering of unwanted low frequency components associated with the high speed data can be incorporated into the interface units 142A . . . 142M. Alternatively, such filtering could be accomplished in the analog domain before conversion of the analog signals associated with the line support unit into digital signals. In that case, the filtered analog signals would be sent via lines 148A . . . 148N to the HSDU and the interface unit 142A . . . 142M would process the filtered analog signals. An important aspect of the invention resides in not having to provide such filtering at the "front end" of the line support circuit where large filter components would be required.

A controller 150 provides call processing communications and instructions among the central office via line 152, HSDU 140 via line 154, and the SIUs via line 156. A microprocessor 158 is supported by read only memory (ROM) 160 and random access memory (RAM) 162. The microprocessor 158 is connected to input/output interface 164 which supports the receipt and transmission of signals over lines. 152, 154 and 156. Call processing instructions and status information are communicated on line 152 between the central office and MLIU 120 via controller 150. Instructions are communicated on line 154 to HSDU 140 to control the path selections made by selector 146. Call processing information is carried on line 156 between controller 150 and the SIUs.

It will be apparent to those skilled in the art that various implementations of the present invention is possible. For example, very large scale integration (VLSI) techniques could be used to construct a multiple line interface unit wherein the required functions in the SIUs could be provided in a common shared circuit. A DSP with sufficient power and capabilities could service several if not all of the SIUs. Further, common functions of the XDSL interface units suggest several if not all of these units could be combined into a shared processing circuit or chip. It is also contemplated that the functions of the HSDUs and the SIUs could be combined in whole or in part by a sufficiently powerful DSP or DSPs or a computing system. Alternatively, the internal components of the MLIU could be segregated by analog and digital functions.

An example of a subscriber receiving XDSL services is explained below with regard to the embodiment shown in FIG. 4. The following steps describe providing XDSL services for the subscriber as the called party.

1. The central office equipment sends a call setup message by channel 152 to controller 150. The central office setup message identifies the subscriber line to which high speed data services is to be provided. Controller 150 maintains a stored table that correlates subscriber lines to corresponding subscriber interface units, and hence the SIU to receive XDSL information is known based on the identity of the subscriber line.
2. Controller 150 generates a command transmitted via communication path 156 to SIU 124A supporting subscriber line 122A. The subscriber served by subscriber line 122A is the party to receive XDSL communications in this illustrative example.
3. Controller 150 generates another command signal transmitted on line 154 to the HSDU 140 (selector 146) which identifies input line 148A to be utilized to provide XDSL communications with line interface unit 124A. Controller 150 stores a table of availability of the interface units 142A . . . 142M and assigns a not in use high speed interface unit such as 142A to handle the XDSL communications with subscriber line 122A.
4. Following the establishment of a communication path between the subscriber line 122A and the HSDU 140, controller 150 sends a reply message via channel 152 to the central office equipment confirming that the requested XDSL communication path has been established and identifying the high speed data unit 142A and corresponding line 144A which will carry the subject XDSL communication between the central office equipment and MLIU 120. Thus, a completed path to the central office is now available to carry XDSL communications with customer premises equipment coupled to subscriber line 122A.

In the above example, the controller 150 maintains a database of the availability of the interface units 142A . . . 142M to handle an XDSL service request. Alternatively, the central office could maintain a table or database of interface unit availability and provide controller 150 with the identification of the interface unit to be used.

The following steps illustrate the origination of a request by a subscriber for XDSL services implemented on an on demand basis.

1. For this illustrative example, assume that the subscriber requesting XDSL services is associated with subscriber line 122A. Utilizing customer premises equipment coupled to subscriber line 122A, the subscriber will initiate a request for XDSL communications such as by sending a request for services signal to the associated SIU 124A.
2. Using known signal detection techniques, the DSP 132 of SIU 124A will recognize the request for services signal.
3. SIU 124A will then generate a command on line 156 advising controller 150 of the request for XDSL services by the subscriber associated with line 122A.
4. The controller 150 transmits a service request on line 152 to the central office. The central office after checking the availability of one of lines 144A . . . 144M sends an instruction to controller 150 advising of the line, e.g. 144A, to be used in accommodating this request for services.
5. The controller 150 transmits a command signal on line 154 to HSDU 140 (selector 146) indicating the XDSL interface unit 142A to be connected to SIU 124A via line 148A.
6. The controller 150 preferably further generates a command signal on line 156 to SIU 124A to advise of the path completion.
7. Thus, an XDSL communication path is established between the subscriber's customer premise equipment associated with subscriber line 122A and high speed data line 144A which carries simplex inbound and outbound communications to the central office equipment.

It is also contemplated that the high speed services could be provisioned by a telecommunication system administrator, e.g. so called "nailed up". In this circumstance, one of lines 144A . . . 144M would be assigned on a good until changed basis to one of the SIUs and hence to a subscriber served by that SIU. In this arrangement, the subscriber would always have immediate access to high speed facilities.

While the specification in this invention is described in relation to certain implementations or embodiments, many details are set forth for the purpose of illustration. Thus, the foregoing merely illustrates the principles of the invention. For example, this intervention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention are thus within its spirit and scope.

Although an explanation of embodiments of the present invention have been made above with reference to the drawings, the scope of the invention is defined by the claims which follow.

What is claimed is:

1. A method of providing Integrated Services Digital Network (ISDN) and high speed data (HSD) services to a subscriber in a telecommunications system having a line termination unit that supports ISDN and HSD services over a common two-wire subscriber line comprising the steps of:

receiving incoming ISDN and HSD signals from the subscriber line coupled to a line support circuit;

transmitting outgoing ISDN and HSD signals to the subscriber line;

separating received incoming analog signals into first and second signals where the first signals represent ISDN information and the second signals represent HSD information;

converting the first signals into third digital signals having a format used for ISDN signals by an associated central office and transmitting the third digital signals to the central office;

converting the second signals into fourth digital signals having a format used for HSD signals by an associated central office; and transmitting the fourth digital signals to the central office.

2. The method of claim 1 including the steps of receiving at an office interface outgoing digital ISDN and HSD signals from the central office, converting the outgoing digital ISDN signals into fifth signals and for converting the outgoing digital HSD signals into sixth signals where the fifth and sixth signals are analog signals representing ISDN information and HSD information, respectively, and combining the fifth and sixth signals into a combined signal that is coupled to the line support circuit which transmits the combined signal to the subscriber line.

3. The method of claim 1 in which the step of separating includes providing a first filter which permits said first signals to pass.

4. The method of claim 3 in which the step of separating includes providing a second filter which permits the second signals to pass.

5. The method of claim 1 wherein said line support circuit has sufficient frequency bandwidth to convey the HSD information which requires a higher bandwidth than bandwidth needed to convey the ISDN information.

6. The method of claim 1 wherein the HSD services consist of asymmetric digital subscriber loop (ADSL) services.

7. The method of claim 1 wherein the HSD services consist of digital subscriber loop (XDSL) services.

8. The method of claim 1 wherein the HSD services consist of asymmetric digital subscriber loop (ADSL) lite services.

9. The method of claim 1 wherein the HSD services consist of very high speed digital subscriber loop (VDSL) services.

10. A line termination unit in a telecommunications system that supports integrated services digital network (ISDN) and high speed data (HSD) services to a subscriber over a common two-wire subscriber line, the line termination unit comprising:

a line support circuit that connects to said common two-wire line and provides ISDN to said line, the line support circuit including means for receiving incoming ISDN and HSD signals from said line and means for transmitting outgoing ISDN and HSD signals to said line;

means coupled to the line support circuit for separating the received incoming analog signals into first and second signals where the first signals represent ISDN information and the second signals represent HSD information;

means coupled to said separating means for converting the first signals into third digital signals having a format used for ISDN signals by an associated central office and transmitting the third digital signals to the central office; and means coupled to said separating means for converting the second signals into fourth digital signals having a format used for HSD signals by an associated central office and transmitting the fourth digital signals to the central office.

11. The line termination unit according to claim 10 further comprising:

office interface means for receiving outgoing digital ISDN and HSD signals from the central office;

means coupled to the office interface means for converting the outgoing digital ISDN signals into fifth signals and for converting the outgoing digital HSD signals into sixth signals where the fifth and sixth signals are analog signals representing ISDN information and HSD information, respectively;

means coupled to said converting means for combining the fifth and sixth signals into a combined signal that is coupled to the line support circuit which transmits the combined signal to the subscriber line.

12. The line termination unit according to claim 10 wherein said line support circuit has sufficient frequency bandwidth to convey the HSD information which requires a higher bandwidth than bandwidth needed to convey the ISDN information.

13. The line termination unit according to claim 10 wherein the HSD services consists of asynchronous digital subscriber loop (ADSL) services.

14. A multiple line termination unit in a telecommunications system that supports integrated services digital network (ISDN) and high speed data (HSD) services for N subscribers over common two-wire subscriber lines where N is a positive integer greater than one, the multiple line termination unit comprising:

a plurality of subscriber interface units (SIU) for connection to the respective two-wire subscriber lines, each SIU provides ISDN to a respective two-wire subscriber line and includes means for receiving incoming ISDN and HSD signals from the line and means for transmitting outgoing ISDN and HSD signals to the line, each SIU provides an interface between ISDN signals on the associates subscriber line and digitized ISDN signals communicated with the central office;

high speed data unit (HSDU) which supports M concurrent HSD channels where M is a positive integer less than N, the HSDU comprises a selector which is coupled to each SIU, the selector controlling which of the SIUs will be coupled to one of said HSD channels.

15. The multiple line termination unit according to claim 14 further comprising:

a controller coupled to an associated central office, the HSDU and each SIU, the controller providing call processing communications including instructions that control the operation of said selector.

* * * * *